US010759515B2

(12) United States Patent
Van De Veire et al.

(10) Patent No.: US 10,759,515 B2
(45) Date of Patent: Sep. 1, 2020

(54) ELECTROMECHANICAL HINGE-LINE ROTARY ACTUATOR

(71) Applicant: Hamilton Sundstrand Corporation, Charlotte, NC (US)

(72) Inventors: Nicholas R. Van De Veire, Tempe, AZ (US); Derick S. Balsiger, Mayer, AZ (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 344 days.

(21) Appl. No.: 15/699,355

(22) Filed: Sep. 8, 2017

(65) Prior Publication Data

US 2018/0015999 A1 Jan. 18, 2018

Related U.S. Application Data

(63) Continuation-in-part of application No. 14/482,004, filed on Sep. 10, 2014, now abandoned.

(51) Int. Cl.
| | |
|---|---|
| *B64C 9/02* | (2006.01) |
| *H02K 7/14* | (2006.01) |
| *H02K 7/116* | (2006.01) |
| *H02K 1/18* | (2006.01) |
| *B64C 9/00* | (2006.01) |
| *B64C 13/50* | (2006.01) |

(52) U.S. Cl.
CPC ............. *B64C 9/02* (2013.01); *B64C 9/00* (2013.01); *B64C 13/50* (2013.01); *H02K 1/187* (2013.01); *H02K 7/116* (2013.01); *H02K 7/14* (2013.01); *B64C 2009/005* (2013.01)

(58) Field of Classification Search
CPC .. B64C 13/50; B64C 9/02; B64C 9/00; B64C 2009/005; H02K 7/116; H02K 7/14; H02K 1/187; F16H 49/001
USPC ........................................................ 244/228
See application file for complete search history.

(56) References Cited

U.S. PATENT DOCUMENTS

| | | |
|---|---|---|
| 2,966,808 A | 1/1961 | Grudin |
| 3,169,201 A | 2/1965 | Spring et al. |
| 3,435,705 A | 4/1969 | Musser |
| 3,495,108 A | 2/1970 | Van Buskirk |

(Continued)

FOREIGN PATENT DOCUMENTS

| | | | |
|---|---|---|---|
| CN | 201004577 Y | * | 1/2008 |
| CN | 201004577 Y | | 1/2008 |

(Continued)

OTHER PUBLICATIONS

CN 201004577 Y Description Machine Translation, Espacenet.com, accessed Oct. 15, 2019 (Year: 2008).*

(Continued)

*Primary Examiner* — Assres H Woldemaryam
(74) *Attorney, Agent, or Firm* — Cantor Colburn LLP

(57) ABSTRACT

An electromechanical rotary actuator includes a drive member, a motor disposed inside and directly coupled to the drive member, and an output arm. The motor has a rotor configured toward an outside of the motor and directly coupled to an input of the drive member and a stator configured toward an inside of the motor and positioned inside the rotor. The output arm is disposed about the motor and is drivably connected to the drive member. The output arm defines an arcuate opening.

18 Claims, 3 Drawing Sheets

(56) References Cited

U.S. PATENT DOCUMENTS

| | | | |
|---|---|---|---|
| 3,900,198 | A | 8/1975 | Conner |
| 4,398,110 | A * | 8/1983 | Flinchbaugh .......... B25J 9/1025 |
| | | | 310/83 |
| 4,575,027 | A | 3/1986 | Cronin |
| 5,052,537 | A | 10/1991 | Tysver et al. |
| 5,497,041 | A | 3/1996 | Kondoh et al. |
| 6,566,777 | B2 | 5/2003 | Abuakeel |
| 7,453,176 | B2 | 11/2008 | Davison |
| 9,157,517 | B2 | 10/2015 | Lunin et al. |
| 9,394,984 | B2 | 7/2016 | Balsiger |
| 2003/0080246 | A1 | 5/2003 | Koizumi et al. |
| 2003/0156948 | A1 | 8/2003 | Malmquist et al. |
| 2006/0068960 | A1 | 3/2006 | Kopecek |
| 2007/0039414 | A1 | 2/2007 | Takemura |
| 2007/0241696 | A1 | 10/2007 | Lauria et al. |
| 2008/0079381 | A1 | 4/2008 | Hanlon et al. |
| 2011/0298310 | A1 | 12/2011 | Ross et al. |
| 2013/0320782 | A1 | 12/2013 | Matalanis et al. |
| 2014/0083216 | A1 | 3/2014 | Brewer et al. |
| 2014/0111045 | A1 | 4/2014 | Goepel |
| 2015/0217855 | A1 * | 8/2015 | Davies .................... B64C 13/50 |
| | | | 244/99.13 |
| 2016/0152322 | A1 | 6/2016 | Balsiger et al. |
| 2016/0229525 | A1 | 8/2016 | Van De Veire |

FOREIGN PATENT DOCUMENTS

| | | | |
|---|---|---|---|
| CN | 201008117 | Y | 1/2008 |
| CN | 101517271 | A | 8/2009 |
| CN | 103507946 | A | 1/2014 |
| CN | 103545981 | A | 1/2014 |
| DE | 112010005656 | T5 | 3/2013 |
| WO | 2011155866 | A1 | 12/2011 |
| WO | WO-2011155866 | A1 * | 12/2011 ........... B64C 13/505 |
| WO | 2014029972 | A1 | 2/2014 |
| WO | 2016024340 | A1 | 4/2017 |

OTHER PUBLICATIONS

Wikipedia, "Harmonic_drive"; https://en.wikipedia.org/wiki/Harmonic_drive; archived by the Internet Archive on May 18, 2013, https://web.archive.org/web/20130518064138/http://en.wikipedia.org/wiki/Harmonic_drive, accessed Nov. 26, 2016.

Chinese First Office Action and Search Report from the Chinese Patent Office for CN Application No. 201510575701.2 dated Jul. 27, 2018, 15 pages, English Translation Included.

BR Office Action for Application No. BR102015022082-0, dated Apr. 14, 2020, 4 pages.

* cited by examiner

ELECTROMECHANICAL HINGE-LINE ROTARY ACTUATOR

CROSS-REFERENCE TO RELATED APPLICATIONS

This application is a continuation-in-part of application Ser. No. 14/482,004 filed Sep. 10, 2014, which is incorporated herein by reference in its entirety.

BACKGROUND OF INVENTION

This invention relates, generally, to an actuator and, more specifically, to an electromechanical hinge-line rotary actuator for use with a thin-wing aircraft in flight-control applications.

Many systems require actuators to manipulate various components. Rotary actuators rotate an element about an axis. In flight-control applications, there has been a trend toward a thinner wing such that size and space are limited at a point of attachment between the wing and an aileron (a wing-control surface) of an aircraft.

This trend has driven use of a rotary actuator of a "hinge-line" design, wherein a rotational axis of the actuator is aligned with that of the aileron and the actuator acts as a hinge (hence, the term "hinge-line"). This trend also raises a need for such an actuator with a tighter cross-section, which limits the diameter of a motor of the actuator, and higher power density.

In turn, torque of the motor is directly related to the motor diameter and current flowing through windings of the motor. However, with the limited motor diameter and an amount of the current being limited to useable amounts on a power bus of the aircraft, an amount of such torque is limited as well. And, since power of the motor equates to speed thereof times the torque amount and this amount is limited, the speed must be higher. Yet, use of the higher-speed motor at the limited torque amount is driving use of higher gear ratios, which makes inertia of the motor a sensitive design parameter.

More specifically, reflected inertia comes into play whenever the motor or a gear set of the aircraft is trying to be back-driven, which is a requirement for a surface of the aileron. And, reduction in the inertia prior to a gear affects the reflected inertia by a factor of a gear ratio squared (for example, a "10:1" gear ratio yields a reflected inertia of 100 times greater than the motor inertia while a "100:1" gear ratio yields a reflected inertia of 10,000 times greater). The inertia also affects responsiveness of the aircraft—i.e., a higher level of the inertia results in a lower responsiveness.

A typical electromechanical hinge-line rotary actuator designed for flight-control applications is arranged to use a conventional motor that is framed (i.e., encased, housed, or mounted) and includes a rotor. The rotor is disposed inside the frame and indirectly connected to an end of a planetary gearbox or gear set through a drive shaft or coupler. In this way, the motor is disposed exterior to and in alignment with the gear set, and there are bearings for the motor and gear set. Such alignment is accomplished by a precision-machined housing for the motor and gear set or compliant coupling on an output shaft of the motor to an input of the gear set. This arrangement has inefficiencies associated with packaging and is not optimized for typical requirements of such an actuator. More specifically, it is not optimized for power density, performance, and reliability.

Accordingly, it is desirable to provide an electromechanical hinge-line rotary actuator an arrangement of which does not have inefficiencies associated with packaging and is optimized for typical requirements of such an actuator in flight-control applications. More specifically, it is desirable to provide such an actuator that reduces inertia and is optimized for power density, performance, and reliability.

BRIEF DESCRIPTION OF INVENTION

According to a non-limiting exemplary embodiment of the invention, an electromechanical rotary actuator is provided. The actuator includes a drive member, a motor disposed inside and directly coupled to the drive member, and an output arm. The motor has a rotor configured toward an outside of the motor and directly coupled to an input of the drive member and a stator configured toward an inside of the motor and positioned inside the rotor. The output arm is disposed about the motor and is drivably connected to the drive member. The output arm defines an arcuate opening.

According to another non-limiting exemplary embodiment of the invention, an electromechanical rotary actuator is provided. The actuator includes a drive member, a motor disposed inside and directly coupled to the drive member, a ground arm, and an output arm. The motor has a rotor configured toward an outside of the motor and directly coupled to an input of the drive member and a stator configured toward an inside of the motor and positioned inside the rotor. The ground arm has an extension member that extends into and is fixedly attached to the stator. The output arm is operatively connected to the ground arm and is pivotable responsive to rotation of the drive member. The output arm defines an opening having a harmonic circular spline that engages the drive member.

According to yet another non-limiting exemplary embodiment of the invention, a wing of an aircraft is provided. The wing includes an aileron portion, a wing spar, and an electromechanical hinge-line rotary actuator. The aileron portion defines an axis of rotation and including an aileron spar. The actuator includes a drive member, a motor, a ground arm, and an output arm. The motor includes a rotor directly coupled to an input of a drive member and a stator positioned inside the rotor. The output arm that is disposed about the motor and is drivably connected to the drive member. The output arm has a proximal end and a distal end that is connected to the aileron spar and defines an arcuate opening that is disposed proximate the distal end. The ground arm has a first end connected to the wing spar and a second end has a pin that is at least partially received within the arcuate opening. The drive member, rotor, stator, ground arm, and the output arm are arranged concentrically with each other.

BRIEF DESCRIPTION OF DRAWING

The subject matter that is regarded as the invention is particularly pointed out and distinctly claimed in the claims at the conclusion of the specification. The foregoing and other features and advantages of the invention are apparent from the following detailed description taken in conjunction with the accompanying drawing in which:

DETAILED DESCRIPTION OF INVENTION

Figure 1:
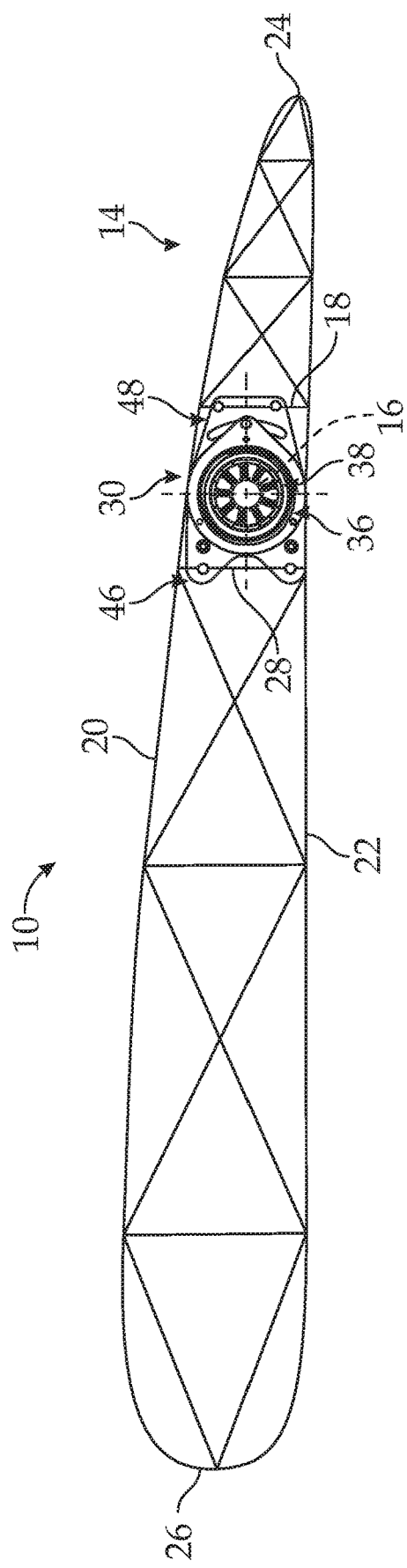
FIG. 1 is an end view of a non-limiting exemplary embodiment of a wing of an aircraft provided with an electromechanical hinge-line rotary actuator according to the invention.

Referring now to FIG. 1, a non-limiting exemplary embodiment of a wing of an aircraft (not shown) is generally indicated at 10. Although the wing 10 is disclosed herein as being implemented with a non-rotary-wing aircraft, such as an airplane, it should be appreciated that the wing 10 can be implemented with any suitable type of aircraft, in general, and non-rotary-wing or rotary-wing aircraft (such as a helicopter), in particular.

As shown in FIG. 1, the wing 10 is one of two substantially similar wings of a lift system of the aircraft (in contrast, a rotor blade would be one of a plurality of substantially similar rotor blades of a rotor system of a helicopter). The wing 10 defines a root portion (not shown) that extends to tip portion (not shown) through an aileron portion, generally indicated at 14, which acts as a flight-control or an output-control surface (such as a wing flap). The aileron portion 14 also defines, in turn, an axis of motion or rotation 16 and includes an aileron spar, generally indicated at 18 and includes a trailing edge 24. The wing 10 defines further first and second opposing surfaces 20, 22, a leading edge 26 and includes a rearward wing spar, generally indicated at 28.

The wing 10 includes also a control system (not shown) that has an electromechanical hinge-line rotary actuator, generally indicated at 30, and a controller (not shown). The actuator 30 extends about the axis of rotation 16. The controller may be mounted to or near the actuator 30 and is operatively linked to the actuator 30 and a control system (not shown).

A stationary attachment bracket or ground arm, generally indicated at 46, of the actuator 30 is mounted to the wing rearward wing spar 28 and configured to be attached to interior structure of the wing 10. A rotatable attachment bracket or an output arm, generally indicated at 48, of the actuator 30 is mounted to a frame of or within an interior of the aileron portion 14. The mounting is highly flexible as long as the axis of rotation 16 of the aileron portion 14 is aligned with an axis of rotation 16 of the actuator 30. The actuator 30 allows wing flexing and, hence, does not put undue stress on the wing 10 at points of attachment when flex is encountered, such as during turbulence.

It should be appreciated that the control system can also define a plurality of control surfaces (not shown) arranged within the aileron portion 14 and selectively deployed between the first and second surfaces 20, 22 to affect flight dynamics of the wing 10. Each surface defines first and second surface portions. The actuator 30 is configured to rotate the surface from a first or neutral position, such that the surface is disposed within the wing 10, to a second or deployed position, such that the surface extends out an outer periphery of the wing 10. At this point, it should be appreciated that the above description is provided for the sake of completeness and to enable a better understanding of one non-limiting exemplary application of the actuator 30.

Figure 2:
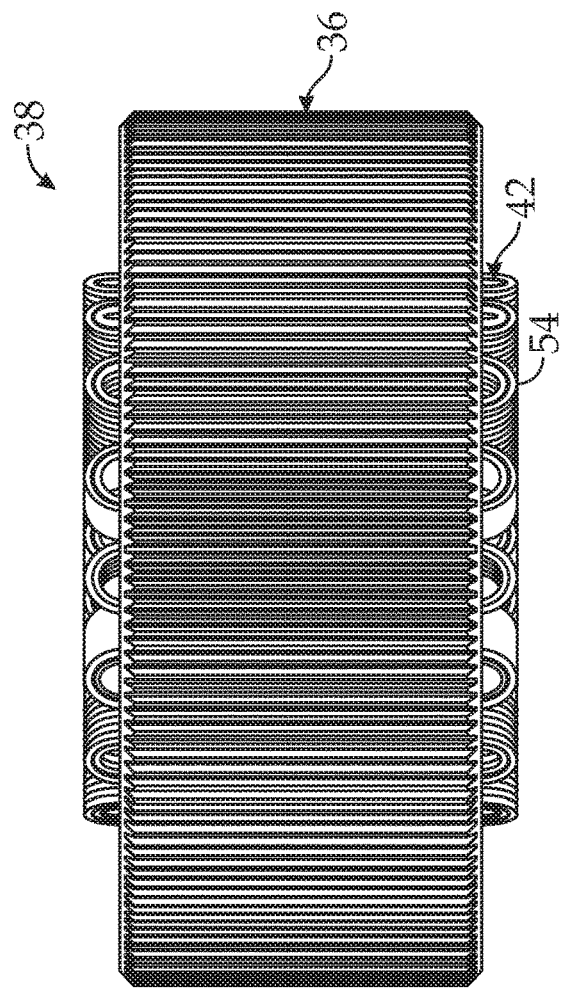
FIG. 2 is a schematic top view of a non-limiting exemplary embodiment of the electromechanical hinge-line rotary actuator according to the invention.
Figure 3:
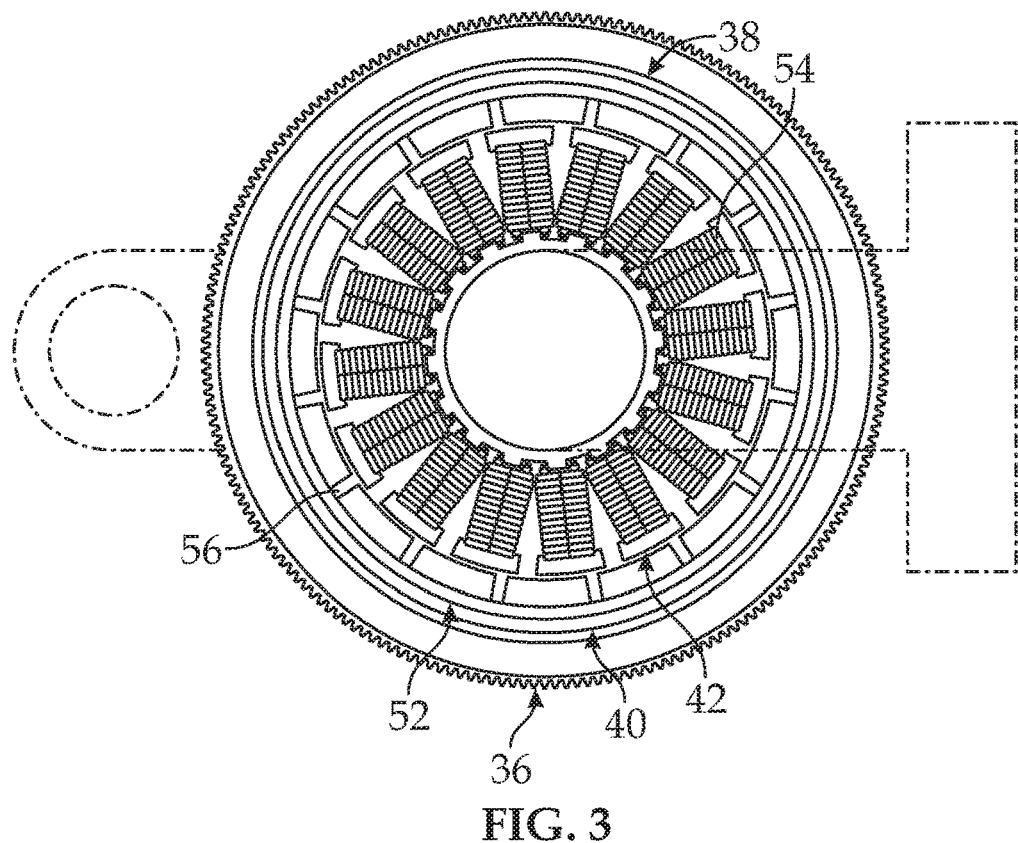
FIG. 3 is a schematic side environmental view of the embodiment of the electromechanical hinge-line rotary actuator illustrated in FIG. 2.
Figure 4:
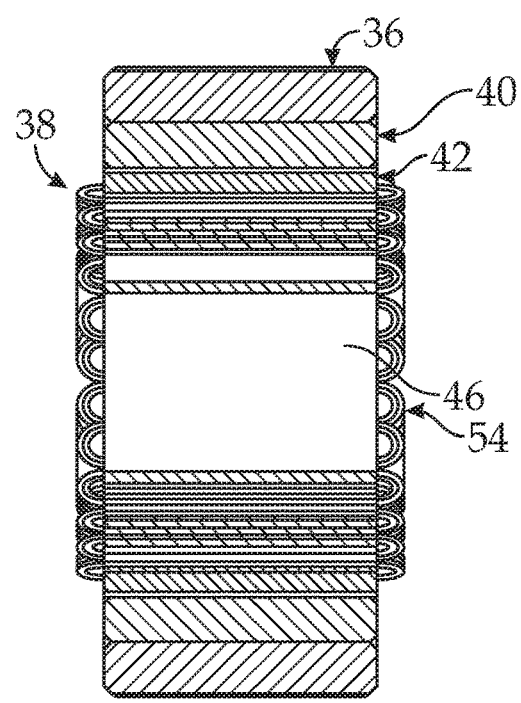
FIG. 4 is a schematic sectional side view of the embodiment of the electromechanical hinge-line rotary actuator illustrated in FIG. 2.

Referring now to FIGS. 2-4, a non-limiting exemplary embodiment of the actuator 30 is shown. The actuator 30 is disclosed herein as being implemented with a control system for a flight-control application. However, it should be appreciated that the actuator 30 can be implemented in any suitable system capable of operating in multiple environments and should not be considered as being limited to non-rotary or rotary aircraft or aircraft of any kind.

The actuator 30 includes, in general, a drive member, generally indicated at 36, a motor, generally indicated at 38 (FIG. 1), is disposed inside and directly coupled to the drive member 36. Referring to FIG. 3, the motor 38 includes a rotor, generally indicated at 52, configured toward an outside of the motor 38 and directly coupled to an input (not shown) of the drive member 36 and a stator, generally indicated at 42, configured toward an inside of the motor 38 and positioned inside the rotor 52. The drive member 36, rotor 52, and stator 42 are arranged substantially concentrically with each other. The stator 42 is fixed relative to the rotor 52. The drive member 36 is disposed about the rotor 52. More specifically, the rotor 52 and stator 42 combine with each other to make up the motor 38.

Figure 5:
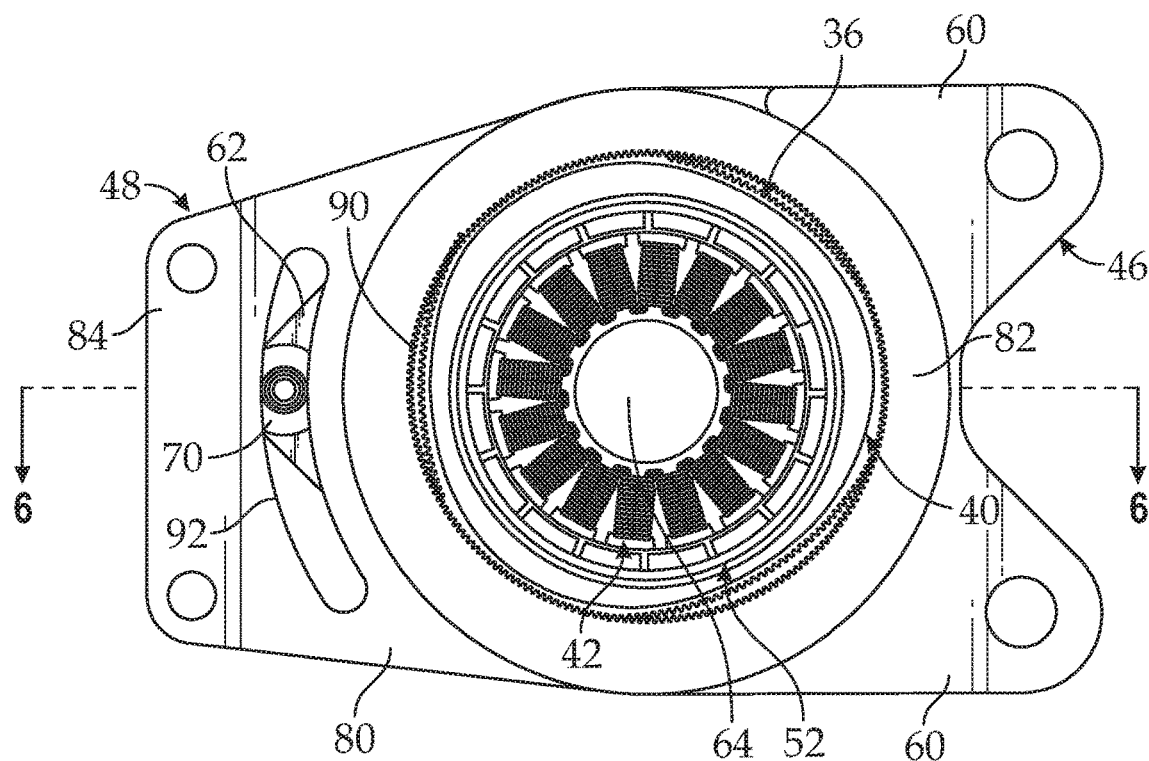
FIG. 5 is a schematic side environmental view of the embodiment of the electromechanical hinge-line rotary actuator of FIG. 1.
Figure 6:
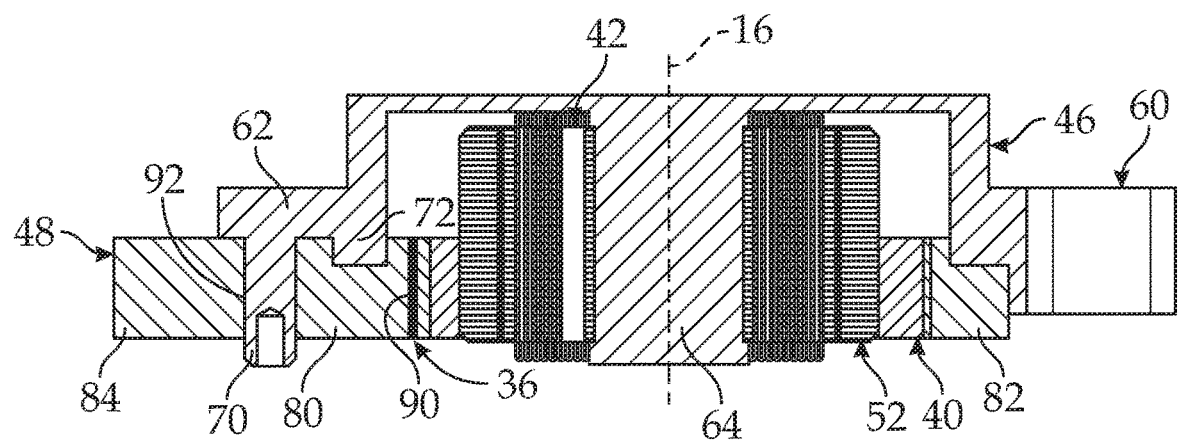
FIG. 6 is a schematic sectional side view of the embodiment of the electromechanical hinge-line rotary actuator illustrated in FIG. 5 taken along section line B-B.

Referring to FIGS. 5 and 6, the ground arm 46 is disposed about the motor 38 and is spaced apart from the drive member 36. The ground arm 46 is disposed outboard of the output arm 48. The ground arm 46 is operatively connected to the rearward wing spar 28 of the wing 10 and the output arm 48. The ground arm 46 includes a first end 60, a second end 62, and a mounting member 64.

The first end 60 is connected to the wing rearward wing spar 28 and engages a portion of the output arm 48. The second end 62 engages the output arm 48 and extends at least partially through the output arm 48. The second end 62 defines or is provided with a pin 70 and an extension member 72. The pin 70 extends through an opening of the output arm 48. The pin 70 is configured as a mechanical stop that limits rotation or pivoting of the output arm 48 and ultimately the aileron portion 14. The extension member 72 is spaced apart from and disposed parallel to the pin 70. The extension member 72 extends into but not through the output arm 48.

The mounting member 64 is spaced apart and is disposed parallel to the pin 70 and the extension member 72. The mounting member 64 extends along the axis of rotation 16 and extends into the stator 42. The mounting member 64 is fixedly attached to the stator 42 such that the ground arm 46 is fixedly connected to the motor 38.

Referring to FIGS. 5 and 6, the output arm 48 is disposed about the motor 38 and engages the drive member 36. The output arm 48 is disposed on the aileron portion 14 and is operatively connected to the aileron portion 14 and the ground arm 46. The output arm 48 is pivotable about the axis of rotation 16 responsive to rotation of the rotor 52 and the drive member 36. The output arm 48 includes an output arm body 80 that extends between a proximal end 82 and a distal end 84.

The output arm body 80 defines an opening 90 and an arcuate opening 92. The opening 90 has a substantially circular shape and defines a harmonic circular spline that may at least partially engage the harmonic flex spline of the drive member 36. The arcuate opening 92 is disposed proximate the distal end 84 and is arranged to receive the pin 70. Ends of the arcuate opening 92 cooperate with the pin 70 to define mechanical stops that inhibit further rotation of the output arm 48 and the aileron portion 14. The arcuate opening 92 is spaced apart from the opening 90 is disposed between an aileron spar 18 of the aileron portion 14 and the opening 90.

The proximal end 82 abuts the first end 60 of the ground arm 46 such that the first end 60 is at least partially disposed about the proximal end 82 of output arm 48. The distal end 84 is connected to the aileron spar 18 of the aileron portion 14 that is configured as an output-control surface. Rotation of the rotor 52 about the stator 42 rotates the drive member 36 and a wave generator 40 causing the output arm 48 to rotate and the proximal end 82 of the output arm 48 to rotate relative to the ground arm 46 to move, pivot, or actuate the aileron portion 14.

As shown in FIGS. 3 and 4, in a version of the exemplary embodiment, the wave generator 40 is disposed between the rotor 52 of the motor 38 and the drive member 36. The wave generator 40 has a non-circular shape or non-circular profile that is configured as a harmonic flex spline. The wave generator 40 is drivably engaged with rotor 52 and the rotation of the rotor 52 about the axis of rotation 16 rotates the wave generator 40 and the drive member 36 drives the output arm 48 via the harmonic circular spline of the opening 90 of the output arm 48. In particular, the harmonic drive is a gear or gear set having the harmonic drive 40. However, it should be appreciated that the gearing can be other than harmonic. For example, the gear set can be conventional (compound, planetary, simple, etc.). In any event, the gear set acts as a speed-reduction device.

A reduction in number of components and, thereby, cost is achieved with design of the actuator 30. Also, the coupling and precision-machined housing of the known actuator are not required in the actuator 30 since an axis of rotation of the motor 38 is controlled by the drive member 36.

"Reliability" analysis uses essentially a "reliability" factor for each component of a system multiplied by a number of components thereof. Thus, with fewer components of the same reliability with respect to each other, the system is more reliable. The actuator 30 has the fewest components for design of a motor/gear-set combination, leading to higher reliability of the actuator 30.

The motor 38 is a frameless electric motor and can take the form of a brushless motor having the rotor 52 and stator 42. The motor 38 is a high-performance motor (i.e., has a high power-to-weight or power-to-volume ratio or power density). It should be appreciated that the motor 38 can be any suitable type of motor 38 that has a rotor 52 positioned on the outside.

The stator 42 is fixed and includes a plurality of coils 54. The wave generator 40 is disposed about the rotor 52 and engages an exterior/outer surface of the rotor 52. In at least one embodiment, the wave generator 40 is defined by an external/outer surface of the rotor 52 such that the exterior/outer surface 52 is provided with lobular features such that the exterior/outer surface 52 acts as the wave generator of the drive member 36. Alternatively, the wave generator 40 can be shaped to the exterior/outer surface. As shown in FIG. 3, an air gap 56 is defined between the rotor 52 and stator 42.

The actuator 30 is configured to be employed with a thin-wing aircraft. Toward that end, arrangement of the actuator 30 does not have inefficiencies associated with packaging and is optimized for typical requirements of such an actuator in flight-control applications—power density, performance, and reliability. More specifically, the concentric packaging of the drive member 36, the motor 38 (stator 42 and rotor 52), the wave generator 40, the output arm 48, and the ground arm 46 of the actuator 30 provides a higher power density. Also, a load path of the actuator 30 is a direct drive such that a drive shaft is not required, resulting in a lower inertia and, in turn, higher performance. Furthermore, the actuator 30 has few components, which lends itself to higher reliability and reduced cost. In addition, a total stack length of the actuator 30 can be changed to accommodate a higher output load, making the actuator 30 versatile for different applications. Moreover, the actuator 30 can achieve higher forces while it maintains a same cross-section thereof, making the actuator 30 versatile for the different applications.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various non-limiting embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An electromechanical hinge-line rotary actuator comprising:
    a drive member;
    a motor disposed inside the drive member and including a rotor directly coupled to an input of the drive member and a stator included in the motor and positioned inside the rotor; and
    an output arm disposed about the motor and drivably connected to the drive member, the output arm defining an arcuate opening; and
    a wave generator that is disposed between the motor and the drive member,
    wherein the motor is a frameless motor.

2. The electromechanical hinge-line rotary actuator of claim 1, wherein the actuator further comprises a ground arm connected to a spar of a wing of an aircraft and the output arm.

3. The electromechanical hinge-line rotary actuator of claim 2, wherein the ground arm includes a pin that extends into the arcuate opening of the output arm.

4. The electromechanical hinge-line rotary actuator of claim 2, wherein the ground arm is fixedly connected to the motor.

5. The electromechanical hinge-line rotary actuator of claim 1, wherein the wave generator is drivably engaged with the rotor and the drive member is drivably engaged with the output arm.

6. The electromechanical hinge-line rotary actuator of claim 1, wherein the wave generator is defined by an exterior surface of the rotor.

7. An electromechanical hinge-line rotary actuator, comprising:
    a drive member;
    a motor disposed inside and directly coupled to the drive member, the motor including a rotor directly coupled to an input of the drive member and a stator included in the motor and positioned inside the rotor;
    a ground arm having an extension member fixedly attached to the stator; and
    an output arm that is operatively connected to the ground arm and is pivotable responsive to rotation of the drive member, the output arm defining an opening having a harmonic circular spline that engages the drive member, wherein the extension member extends into but not through the output arm.

8. The electromechanical hinge-line rotary actuator of claim 7, wherein the extension member is disposed between a first end that engages a portion of the output arm and a second end.

9. The electromechanical hinge-line rotary actuator of claim 8, wherein the second end is provided with a pin that extends into an arcuate opening that is defined by the output arm.

10. The electromechanical hinge-line rotary actuator of claim 9, wherein ends of the arcuate opening cooperate with the pin to define mechanical stops that inhibit further rotation of the output arm.

11. A wing of an aircraft comprising:
an aileron portion defining an axis of rotation and including an aileron spar;
a wing spar; and
an electromechanical hinge-line rotary actuator, including:
a motor including a rotor directly coupled to an input of a drive member and a stator included in the motor and positioned inside the rotor,
an output arm that is disposed about the motor and drivably connected to the drive member, the output arm having a proximal end and a distal end that is connected to the aileron spar and defines an arcuate opening that is disposed proximate the distal end, and
a ground arm having a first end connected to the wing spar and a second end having a pin that is at least partially received within the arcuate opening; wherein the drive member, rotor, stator, ground arm, and the output arm being arranged concentrically with each other.

12. The wing of claim 11, wherein the electromechanical hinge-line rotary actuator further includes a wave generator that is disposed between the rotor and the drive member.

13. The wing of claim 12, wherein the wave generator has a non-circular shape.

14. The wing of claim 13, wherein the output arm defines an opening that is spaced apart from arcuate opening.

15. The wing of claim 14, wherein the opening has a circular shape.

16. The wing of claim 14, wherein the arcuate opening is disposed between the aileron spar and the opening.

17. The wing of claim 12, wherein the first end is at least partially disposed about the proximal end.

18. The wing of claim 12, wherein rotation of the rotor rotates the drive member and the wave generator to rotate the output arm and actuate the aileron portion.

* * * * *